United States Patent
Kirchmer et al.

(10) Patent No.: US 7,220,119 B1
(45) Date of Patent: May 22, 2007

(54) PRE-STRESSED TIE ROD AND METHOD OF MANUFACTURE

(75) Inventors: Bryan R. Kirchmer, Tulsa, OK (US); Derek Campbell, Sand Springs, OK (US)

(73) Assignee: Force Pro, Tulsa, OK (US)

( * ) Notice: Subject to any disclaimer, the term of this patent is extended or adjusted under 35 U.S.C. 154(b) by 279 days.

(21) Appl. No.: 11/068,299

(22) Filed: Feb. 28, 2005

Related U.S. Application Data

(60) Provisional application No. 60/548,412, filed on Feb. 28, 2004.

(51) Int. Cl.
*B29C 45/64* (2006.01)
*B30B 15/04* (2006.01)
*B23P 11/02* (2006.01)
*B21D 29/04* (2006.01)

(52) U.S. Cl. .......................... 425/595; 29/447; 29/452; 100/214; 425/451.9; 425/472

(58) Field of Classification Search ............ 425/451.9, 425/472, 595; 29/447, 452; 100/214, 230; 254/29 A
See application file for complete search history.

(56) References Cited

U.S. PATENT DOCUMENTS

| | | | | |
|---|---|---|---|---|
| 3,154,006 A | * | 10/1964 | Novak | 29/452 |
| 3,783,774 A | * | 1/1974 | Groos et al. | 100/214 |
| 4,240,342 A | | 12/1980 | Delmer | 100/53 |
| 4,259,054 A | * | 3/1981 | Savage | 425/344 |
| 4,325,298 A | | 4/1982 | Delmer | 100/214 |
| 4,346,578 A | | 8/1982 | Harrison et al. | 72/271 |
| 4,615,857 A | | 10/1986 | Baird | 264/272.17 |
| 5,032,077 A | | 7/1991 | Farrell | 425/533 |
| 5,129,814 A | | 7/1992 | Farrell | 425/533 |
| 5,388,981 A | | 2/1995 | Scharrenbroich | 425/541 |
| 5,742,991 A | * | 4/1998 | Kurth | 29/452 |
| 6,241,508 B1 | | 6/2001 | John et al. | 425/559 |
| 6,250,216 B1 | | 6/2001 | Bornhorst | 100/35 |

* cited by examiner

*Primary Examiner*—James P. Mackey
(74) *Attorney, Agent, or Firm*—Gable Gotwals

(57) ABSTRACT

The present invention relates to a pre-stressed tie rod and method of manufacture. The pre-stressed tie rod can be used on injection molding machines to increase the length of the tie rod and movement of the platen, wherein the tie rods are loaded to restrict mold separation. The pre-stressed tie rods could also be used with other types of presses.

10 Claims, 5 Drawing Sheets

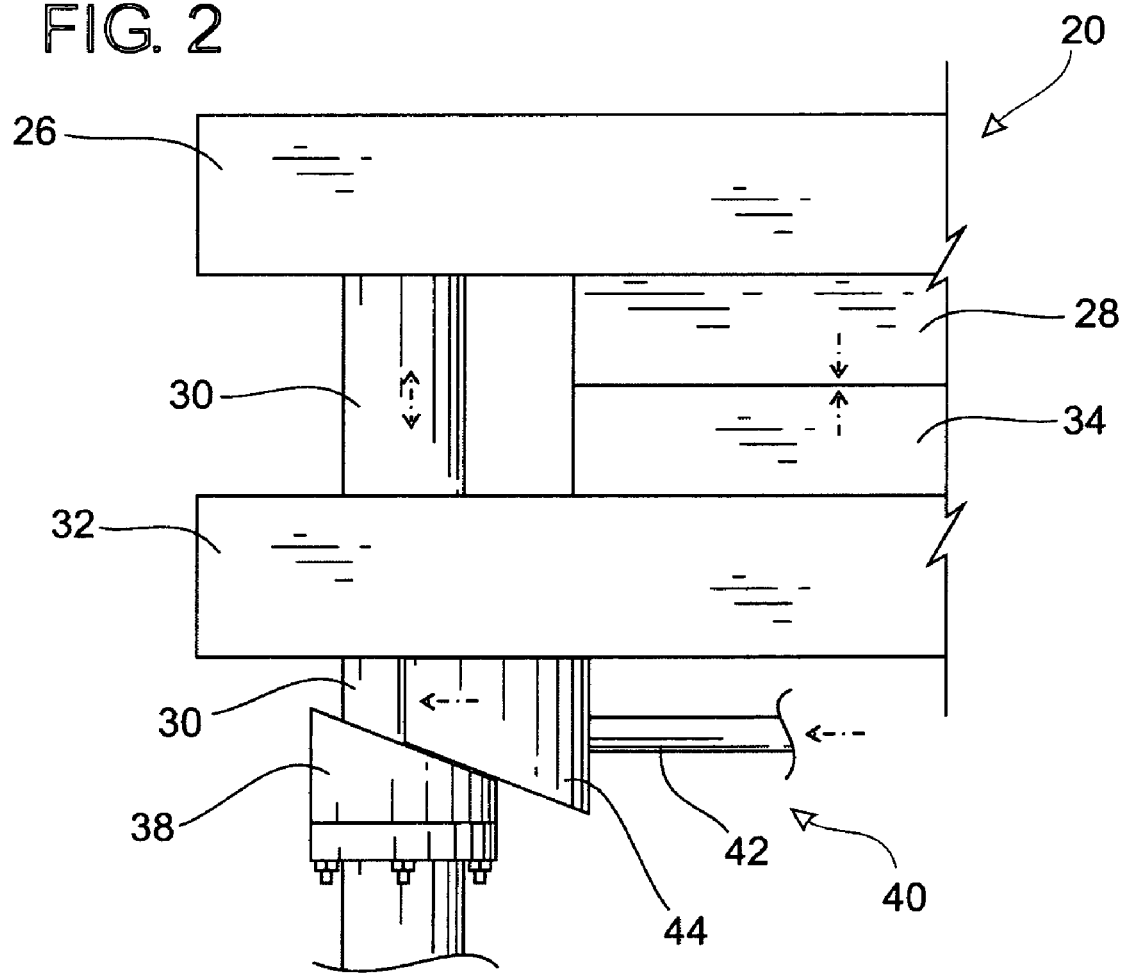

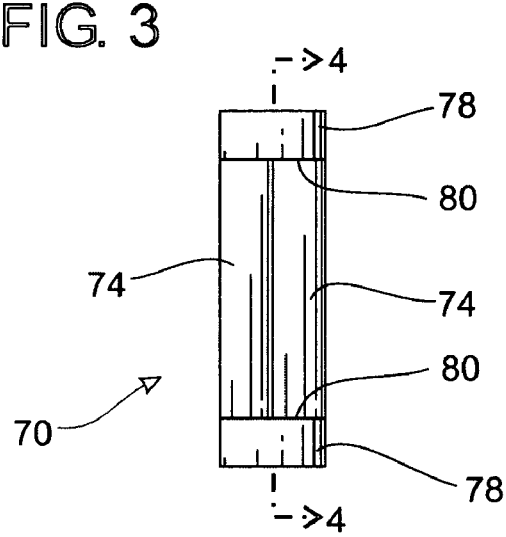
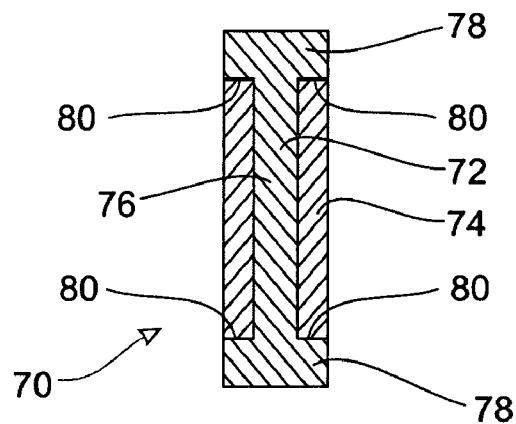
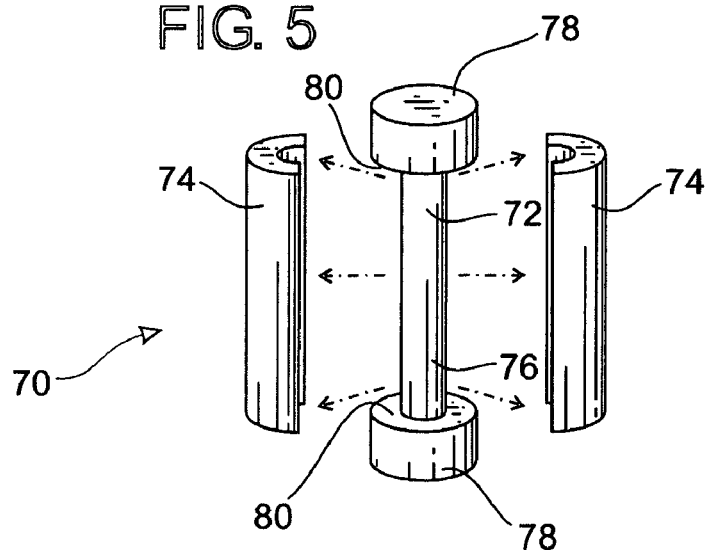

PRE-STRESSED TIE ROD AND METHOD OF MANUFACTURE

This application claims priority of U.S. provisional patent application Ser. No. 60/548,412, entitled "Pre-Stressed Tie Rod and Method of Manufacture," by Bryan R. Kirchmer and Derek Campbell, and having a filing date of Feb. 28, 2004, the description of which is incorporated herein by reference.

BACKGROUND OF THE INVENTION

1. Field of the Invention

This invention relates to a new and improved pre-stressed tie rod and a method of manufacturing the same. More particularly, this invention is directed toward use of an improved pre-stressed tie rod to increase the capacity of plastic molding machines to mold larger parts. Still more particularly, the present invention can also be applied to other types of devices such as presses.

2. Prior Art

Injection molding machines are categorized by the amount of force they are able to exert on a work piece or molding dies. Generally speaking Injection molding machines fall into two types. The first type, the direct force injection molding machine, has been around for many years and uses a large hydraulic cylinder to directly exert a large force on the mold. The second type, the restrained force injection molding machine, is a relatively new concept which uses the strength of tie rods to restrain the molds against the forces created by the molten plastic or other material forced into the die.

The direct force injection molding machine has a static platen, a dynamic platen, a base, a mold or die with two halves and a source of force such as a large hydraulic cylinder. The hydraulic cylinder and static platen are anchored on the base. The hydraulic cylinder moves the dynamic platen in relationship to the static platen. When in use the two halves of the die are contained between the static platen and the dynamic platen. The hydraulic cylinder exerts a force on the dynamic platen which forces the two halves of the die together. The force exerted by the hydraulic cylinder must be greater than the force exerted by the hot molten plastic injected into the die. If it is not the plastic will seep between the two halves of the mold and cause the parts being formed to flash. If the amount of flashing is too great, the parts must be discarded.

The greatest short coming of the direct force injection molding machine is the high energy costs. When the piece is being formed the hydraulic cylinder must maintain the force on the platens and mold the entire time. This requires a large hydraulic pump powering a large hydraulic cylinder to achieve high clamping loads. This translates into higher energy costs to run the molding operation.

The second type of injection molding machine, the restrained force injection molding machine, relies on the strength of the tie rods to hold the two platens and two mold halves together during the molding process. It does not require large hydraulic cylinder to apply force throughout the molding cycle. It uses much smaller hydraulic cylinders to move and lock into place the dynamic platen and the attached half of the mold, the energy consumed by those hydraulic cylinders is much less than the energy consumed using a similar sized direct force injection molding machine.

U.S. Pat. No. 6,241,508, entitled "Multiple Mold Workstation with single Injection Feeder and Hydraulic Pumping Station", issued to John Michael et al., which is incorporated herein by reference, discloses a restrained force injection molding machine. The primary limiting factors in the ability of a restrained force injection molding machine is the capacity of the tie rods. The capacity of the tie rods is determined by the number of tie rods, the cross-sectional area of each tie rod, and the Young's modulus, or otherwise known as the modulus elasticity of the material from which the tie rods are constructed.

One way to increase the capacity of tie rods in other types of devices is to have a pre-stressed tie rod. However, heretofore use of pre-stressed tie rods on injection molding machines is not known. U.S. Pat. No. 4,240,342, entitled Frame Structure for a Press Assembly, issued to Philip T. Delmer on Dec. 23, 1980. The Delmer patent discloses a press assembly having an improved frame, including a crown, bed, cylinder and ram assembly, tied together by tie rods and compression members in which a platen assembly secured to the ram assembly guides directly on the inward facing surface portion of the tie rods.

U.S. Pat. No. 6,250,216, entitled Press Deflection Controller and Method of Controlling Press Deflection, issued to John B. Bornhorst on Jun. 26, 2001. The Bornhorst patent discloses a mechanical press having a press deflection controller. The press includes press members which have work surfaces, such as a slide in a bed. The press deflection controller includes a tie rod which is encased in a tube. The tie rod is connected to the press member and is maintained in tension while the tube is maintained in compression. Adjusting the tension in the tie rod during press operation works to adjust the deflection in the press member.

The Bornhorst patent differs from the Delmer patent in that the tie rods in the Delmer patent run parallel with the direction of the force being applied whereas the pre-stressed tie rod in Bornhorst runs perpendicular to the direction of the force being applied.

When the press is in use, the tie rods are in tension. The tension force in the tie rods is equal to the compression force being exerted on the work piece. The capacity of the press for exerting force on the work piece is limited by the tensile strength of the tie rods. The tensile capacity of the tie rods can be increased by pre-loading the tie rods with compression. When the tie rods have been pre-loaded with a compression force, the total tensile capacity of the tie rod is then equal to the original tensile strength of the tie rod plus the pre-loaded compressive force in the tie rod.

The pre-stressed tie rods disclosed in Delmer, Bornhorst and other prior art typically include a center portion which is threaded on both ends. The center portion is then extended through the center of a tubular member. A nut or other threaded fixture is then engaged on the threads on either end of the center piece. As the nuts travel along the threads of the center piece, they travel toward one another, capturing the tubular member between them. Once the nuts engage the tubular member, they exert a force on the tubular member. This creates a tension in the center piece which is equal to the compression exerted on the tubular members. One of the shortcomings of the prior art is that they rely upon the movement of the nut on the threaded centerpiece to tension the center portion and compress the outer tubular member. The force exerted by this arrangement can be difficult to gauge and balance as well as adjust. This oftentimes leads to less than optimal use of the device.

Because of the innate inaccuracy and difficulty of use of prior art pre-stressed tie rods, heretofore restrained force injection molding machines use single piece tie rods which are not pre-stressed. FIG. 1 shows a restrained force injection molding machine 20. FIG. 2 shows a partial top view of the restrained force injection molding machine shown in FIG. 1. The shortcomings of the prior art tie rods did not allow for the use of pre-stressed tie rods on an injection molding machine.

As can best be seen in FIG. 2, there is a stationary platen 26. The stationary platen 26 serves as a work surface for the injection molding machine 20. The base of the mold 28 is attached to the stationary platen 26. Four tie rods 30 extend perpendicular from the stationary platen 26. The dynamic platen 32 moves in relationship to the stationary platen 26 along the tie rods 30. The second half of the mold 34 is attached to the interior surface of the dynamic platen 32.

In operation, the dynamic platen 32 is moved toward the stationary platen 26 by a hydraulic cylinder 36 until the base and top of the mold 28 and 34 are in contact with one another. Each tie rod 30 has a collar 38 which is fixedly attached to the tie rod 30. The base of the mold 28 and the second half of the mold 34 are forced together by a locking mechanism 40. The locking mechanism 40 is comprised of a hydraulic cylinder 42, with a wedge 44 located on either end of the hydraulic cylinder 42. The locking mechanism 40 creates a force holding the base of the mold 28 and second half of the mold 34 together by the hydraulic cylinder 42 forcing the wedge 44 between the outside surface of the dynamic platen 32 and the collar 38. This places the base and second half of the mold 28 and 34 into compression. At the same time, it puts the tie rods 30 into tension. The tension in the tie rods 30 is equal to the compression force exerted on the base of the mold 28 and second half of the mold 34.

A hot molten plastic is then pumped into the mold at very high pressure. The tie rods 30 deflect in proportion to the force exerted by the hot molten plastic. The force created by the pressure of the molten plastic will cause the tie rod 30 to deflect, causing a gap between the base of the mold 28 and the second half of the mold 34. If the gap is large enough the molten plastic will flash between the base of the mold 28 and the second half of the mold 34. If the flashing is large enough it can take the part being formed out of acceptable tolerances, in which case the part must be discarded.

The deflection of the tie rods 30 can be calculated by the following equation:

$$\delta = \frac{PL}{AE}$$

wherein δ is equal to the length of the deflection, P is equal to the force applied, L is equal to the length of the tie rod, A is equal to the cross-sectional area of the tie rod, and E is equal to the modulus of elasticity of the material from which the tie rods are made.

As can be seen by the equation, one of the limiting factors in determining the deflection is the length of the tie rod. For this reason, restrained force injection molding machine as shown in FIG. 1 typically use a rather short length tie rod 30. This in turn limits the height of the piece which can be formed. For this reason, restrained force injection molding machine such as the one shown in FIG. 1 have been limited to applications such as molding pallets or other short or flat objects. This limitation has prevented them from being used to mold taller objects such as traffic barrels.

SUMMARY OF THE INVENTION

Due to the shortcomings of the prior art, it is an objective of the present invention to provide a pre-stressed tie rod which is easy to use.

Another objective of the present invention is to provide a pre-stressed tie rod which can be used on an injection molding machine to provide a longer usable tie rod than is possible with the prior art.

It is a further objective of the present invention to provide a method for manufacturing an improved pre-stressed tie rod.

It is yet another objective of the present invention to provide a pre-stressed tie rod to enable an injection molding machine to mold tall pieces such as traffic barrels.

It is still another objective of the present invention to provide a pre-stressed tie rod which can be used on a traditional press, thus providing the same capacity while reducing the amount of metal or other material used to construct the frame of the press.

Other objects, features, and advantages will be apparent to persons of ordinary skill in the art in view of the following detailed description of preferred embodiments and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings in which:

FIG. 2 is a partial top view of the prior art plastic injection molding machine shown in FIG. 1.

FIG. 3 is a top view of a tie rod incorporating one embodiment of the present invention.

FIG. 4 is a cross-section view of the tie rod taken along line 4—4 shown in FIG. 3.

FIG. 5 is an exploded view of the tie rod shown in FIG. 3.

DETAILED DESCRIPTION

Figure 1:
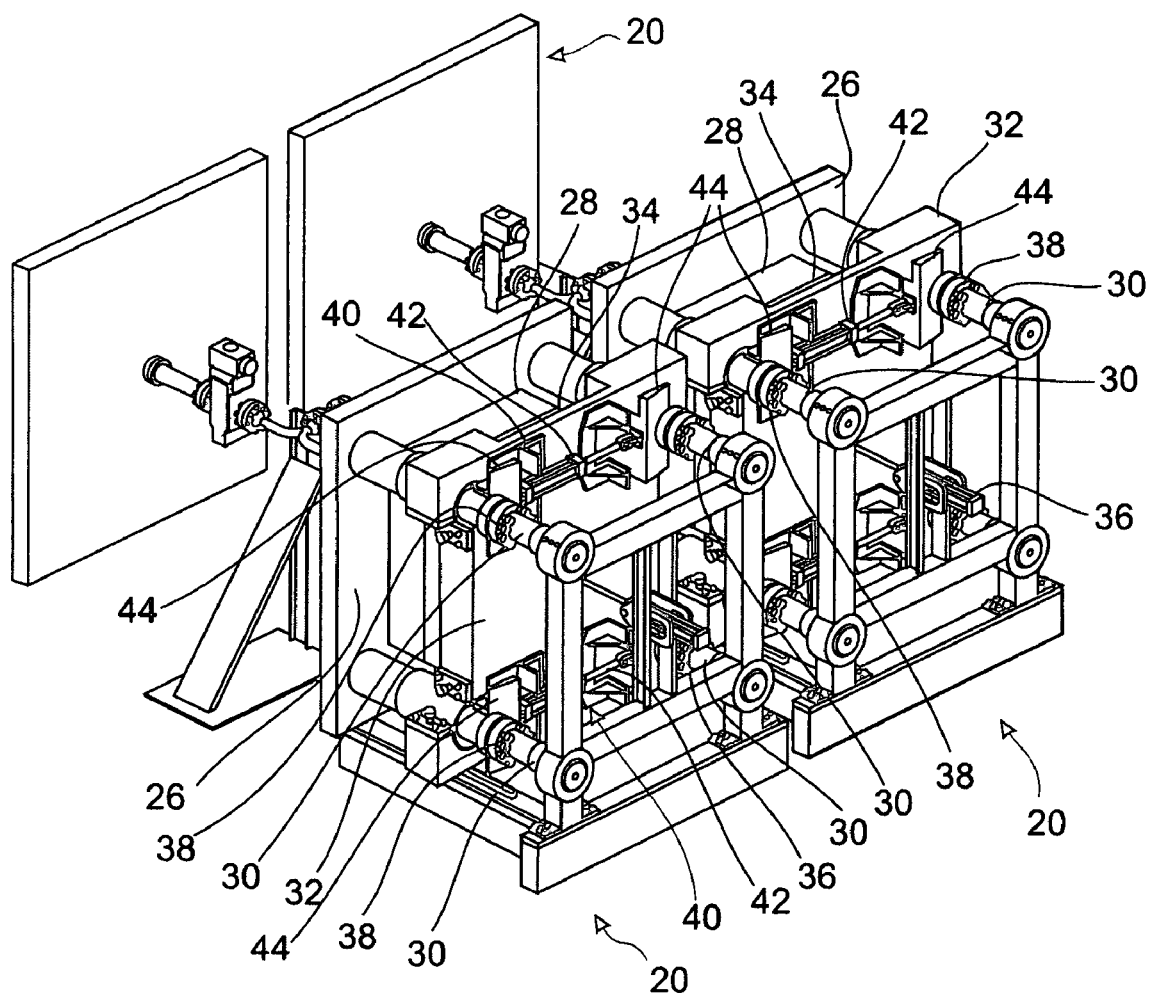
FIG. 1 is a perspective view of a prior art restrained force plastic injection molding machine.

FIG. 3 shows a top view of the preferred embodiment of the improved tie rod 70. FIG. 4 shows a cross-sectional view of the same tie rod 70 taken along the line 4—4, shown in FIG. 3. The same tie rod is shown in an exploded view in FIG. 5. The improved tie rod has a center 72, which is surrounded by an compression sleeve 74. In the preferred embodiment, the center 72 generally has a dumbbell shape, comprising an elongated tensioned core 76 connecting two bases 78. Each base 78 has a shoulder 80 located on the side of the base facing the opposing base 78.

The compression sleeve 74 in its preferred embodiment shown in FIGS. 3, 4 and 5, is constructed from two elongated semi-circular pieces, as best seen in FIG. 5. It should be noted that while the preferred embodiment of the pre-stressed tie rod 70 is shown in FIGS. 3, 4 and 5, other geometric configurations could also be used to achieve the same result and thus should be considered to fall within the scope of the present invention.

In constructing the preferred embodiment of the improved tie rod 70, the center 72 can be formed by casting, forging, machining or any other manufacturing process, out of any material with a suitable modulus of elasticity such as low carbon steel. The compression sleeve 74 can be constructed in a similar manner.

In order to assemble the improved tie rod 70, the center 72 is heated to a desired temperature. This causes the material in the center 72 to expand, thus increasing the distance between the two shoulders 80. Once the center 72 is heated to the desired temperature, the two portions of the compression sleeve 74, being at an ambient temperature or a temperature below that of the center 72, are positioned around the tensioned core 76 of the center 72. The entire assembly of the improved tie rod 70 is then allowed to cool.

During this cooling process, the material in the center 72 contracts. This reduces the distance between the two opposing shoulders 80, thus capturing the sections of the compression sleeve 74 between the two shoulders 80. This in turn creates a tension in the tensioned core 76 of the center 72 and a compression force in the portions of the compression sleeve 74. If necessary, the seams between the sections of compression sleeve 74 can be welded or otherwise joined. Likewise, the seam between the ends of the compression sleeve 74 can be welded or otherwise joined to the shoulder 80 of the center 72.

The pre-loaded compression and tension of the improved tie rod 70 are determined by the amount the overall length of the outer sleeve 70 exceeds the distance between the shoulders 80 of the center 72. It is also a function of the properties of the material used in making the center 72 and the compression sleeve 74. In assembling the improved tie rod 70, the center 72 must be heated to a temperature sufficient to allow the tensioned core 76 of the center 72 to expand to a length such that the distance between the two shoulders 80 of the center 72 is equal to or greater than the overall length of the compression sleeve 74. This is a function of the thermal expansion coefficient of the material used to make the center 72.

Figure 6:
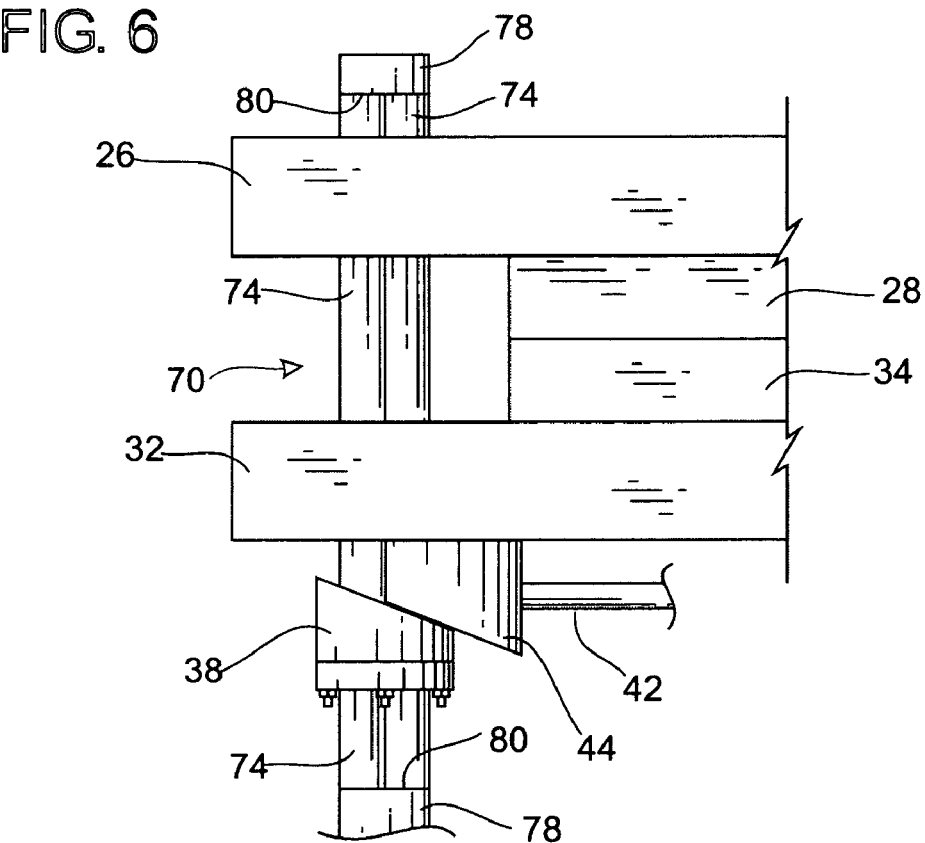
FIG. 6 is a partial top view of a restrained force plastic injection molding machine using one embodiment of the present invention.

FIG. 6 shows a partial top view of restrained force injection molding machine 20 using the improved tie rods 70. As can be seen in comparing FIG. 6 to FIG. 1, the injection molding machine 20 operates in the same manner. However, with the improved tie rod 70 the amount of force the molding machine is capable of exerting on the base and second half of the molds 28 and 34 is increased by the amount of pre-loaded compression in the compression sleeve 74. This increase in the amount of force can be translated into an increase in the overall length of the improved tie rod 70 over what is available with the prior art while using the same material, applying the same amount of force, same cross-sectional area of the tie rod and achieving the same deflection. This means that there can be greater movement of the dynamic platen 32, which in turn means that the injection molding machine 20 using the improved tie rod 70 would now be able to mold larger pieces.

Figure 7:
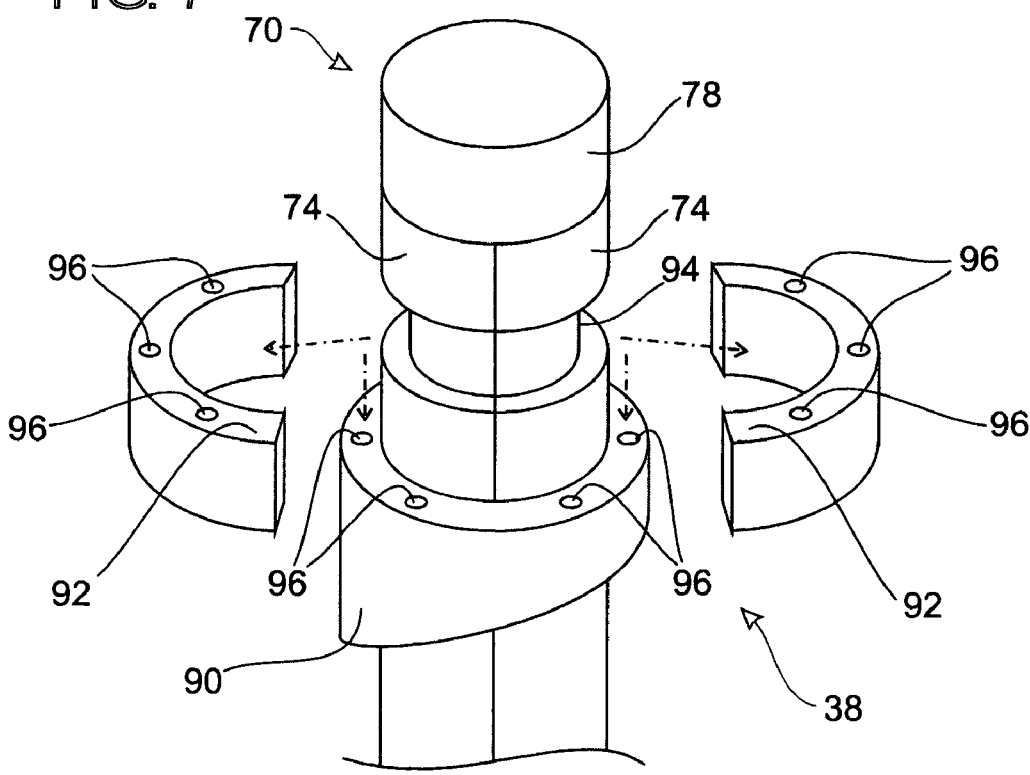
FIG. 7 is an exploded view of the preferred embodiment of the collar and improved pre-stressed tie rod.

FIG. 7 shows an exploded view of the preferred embodiment of the collar 38. The collar 38 has a wedge shaped sleeve 90 and a split collar 92. The interior of the wedge shaped sleeve 90 is sized to fit the outer diameter of the improved tie rod's 70 compression sleeve 74, thus allowing it to be slid along the improved tie rod 70 during assembly or for maintenance purposed. There is a groove 94 which is cut into the outer surface of the compression sleeve 74 of the improved tie rod 70. It should be noted that the depth of the groove 94 is less than the thickness of the compression sleeve 74. The interior diameter of the split collar 92 is sized to fit the inside diameter of the groove 94.

In assembling the collar 38, the wedge shaped sleeve 90 is slid so that it is adjacent the groove 94. The first piece of the split collar 92 is then inserted into the groove 94. Bolts are inserted into the bolt holes 96 and tightened to fasten the split collar 92 to the wedge shaped sleeve 90. The second half of the split collar 92 is then inserted into the groove 94 and bolted to the wedge shaped sleeve 90 in a similar fashion. It should be noted that other types of fasteners could also be used. Further, it is possible to use other configurations of collar 38 while still being within the spirit of the present invention.

Figure 8:
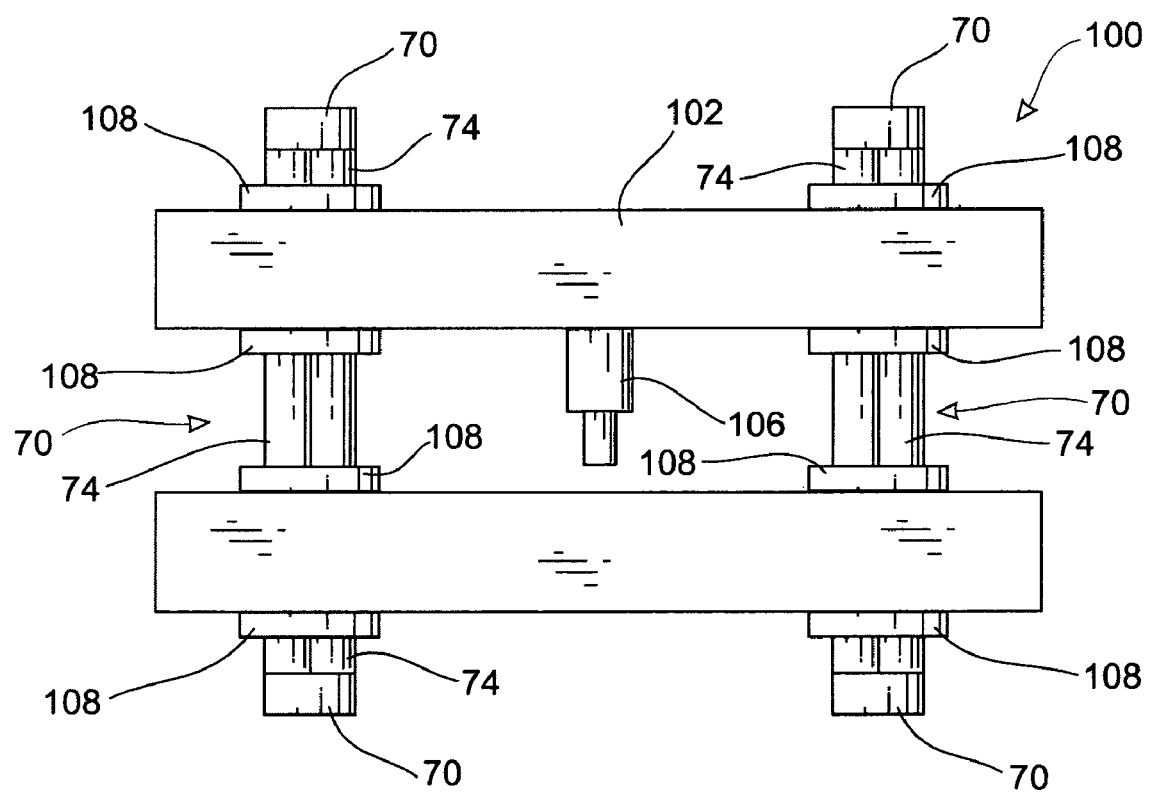
FIG. 8 is a schematic diagram of a press using an embodiment of the present invention.

FIG. 8 shows a schematic of a press 100 using one embodiment of the improved tie rod 70 of the present invention. The press 100 has a crown 102, a work surface 104, two or more tie rods 70 and a hydraulic cylinder 106 or other source of force. The crown 102 and work surface 104 are attached to one another by two or more pre-tensioned tie rods 70. A collar 108 is fastened to the compression sleeve 74 just above and below the tie rods' 70 intersection with the crown 102 and work surface 104. The design of the collar 108 can be similar to the collar 38 shown in FIG. 7, with the wedge shaped sleeve 90 replaced with a cylindrical shaped sleeve. It should also be noted the tie rods 70 can be secured to the crown 102 and work surface 104 by any number of means commonly known while still falling within the spirit of the present invention.

When the press 100 is in use the force exerted by the hydraulic cylinder 106 is equal to the tension in the compression sleeve 74 of the tie rods 70. The capacity of the tie rods is equal to the compression force stored in the compression sleeve plus the tensile strength of the compression sleeve 74. This means the press 100 can be build using less material in the tie rods 70 than would be needed with a single piece unstressed tie rod. This means the cost of the press 100 is less. Further the press 100 is lighter and easier to move thus reducing installation costs.

The foregoing specifications and drawings are only illustrative of the preferred embodiments of the present invention. They should not be interpreted as limiting the scope of the attached claims. Those skilled in the arts will be able to come up with equivalent embodiments of the present invention without departing from the spirit and scope thereof.

What is claimed is:

1. A pre-stressed tie rod comprising:
   A. a body comprising an elongated tensioned core with a first end and a second end, a first base attached to the first end of the core and a second base attached to the second end of the core, each base having a shoulder facing the shoulder on the opposite base;
   B. a compression sleeve sized to be captured between the first and second shoulders wherein the compression sleeve is loaded with a compression force and the elongated tensioned core is loaded with a tension force.

2. A process for making a pre-stressed tie rod comprising:
   A. heating a body comprising an elongated tensioned core with a first end and a second end, a first base attached to the first end of the core a second base attached to the second end of the core, each base having a shoulder facing the shoulder on the opposite base;
   B. placing a compression sleeve between the shoulders
   C. cooling the body to ambient temperature so the compression sleeve is captured between the first and second shoulders wherein the compression sleeve is loaded with a compression force and the elongated tensioned core is loaded with a tension force.

3. The process of claim 2 further comprising forming the compression sleeve out of a plurality of semicircular pieces and fastening the semicircular pieces to the shoulders.

4. The process of claim 3 the fastening is accomplished by welding.

5. The process of claim 2 further comprising forming the compression sleeve out of a plurality of semicircular pieces and fastening the semicircular pieces to one another.

6. The process of claim 5 wherein the fastening is accomplished by welding.

7. A restrained force injection molding machine comprising:
   A. a static platen;
   B. a plurality of tie rods fixedly connected to the static platen, each tie rod comprising
      i. an elongated tensioned core with a first end and a second end, a first base attached to the first end of the core and a second base attached to the second end of the core, each base having a shoulder facing the shoulder on the opposite base; and
      ii. a compression sleeve sized to be captured between the first and second shoulders wherein the compression sleeve is loaded with a compression force and the elongated tensioned core is loaded with a tension force;
   C. a plurality of locking collars, one locking collar fixedly mounted to the compression sleeve of each one of the tie rods;
   D. a dynamic platen moveably mounted on the tie rods between the static platen and the locking collars; and
   E. a plurality of locking mechanisms each comprising a wedge mounted to slidingly engage one of the locking collars and the dynamic platen.

8. The injection molding machine of claim 7 further comprising a hydraulic cylinder mounted to the dynamic platen capable of moving the dynamic platen.

9. The injection molding machine of claim 7 further comprising a plurality of hydraulic cylinders, wherein a hydraulic cylinder is mounted to each of the wedges capable of moving the wedges.

10. The injection molding machine of claim 7 wherein each compression sleeve further comprises a groove and the locking collars comprise a split collar which engages the groove and a wedge shaped collar which is fastened to the split collar.

* * * * *